J. E. POTTER & A. J. RICHARDSON.
Jewelers' Screw Press.

No. 167,019.

Patented Aug. 24, 1875.

Witnesses:
Charls Selder
John C Perkis

Inventors:
James E Potter
Alfred J Richardson

UNITED STATES PATENT OFFICE.

JAMES E. POTTER AND ALFRED J. RICHARDSON, OF PROVIDENCE, R. I.

IMPROVEMENT IN JEWELERS' SCREW-PRESSES.

Specification forming part of Letters Patent No. 167,019, dated August 24, 1875; application filed April 28, 1875.

*To all whom it may concern:*

Be it known that we, JAMES E. POTTER and ALFRED J. RICHARDSON, of Providence, in the county of Providence and State of Rhode Island, have invented certain new and useful Improvements in Jewelers' Screw-Presses; and we do hereby declare that the following is a full, clear, and exact description thereof, reference being had to the accompanying drawings and to the letters of reference marked thereon, which form a part of this specification.

The object of this invention is to construct screw-presses with such parts as are susceptible of wearing and breaking made separate from the bed, which is the principal and expensive part. The invention further consists of an adjustable stop, by which the downward motion of the screw is limited and such position positively retained during the operation of the machine, entirely obviating the difficulties heretofore experienced by the stop moving when doing delicate work.

By reference to the drawings the construction of our screw-press will be readily comprehended.

Figure 1:
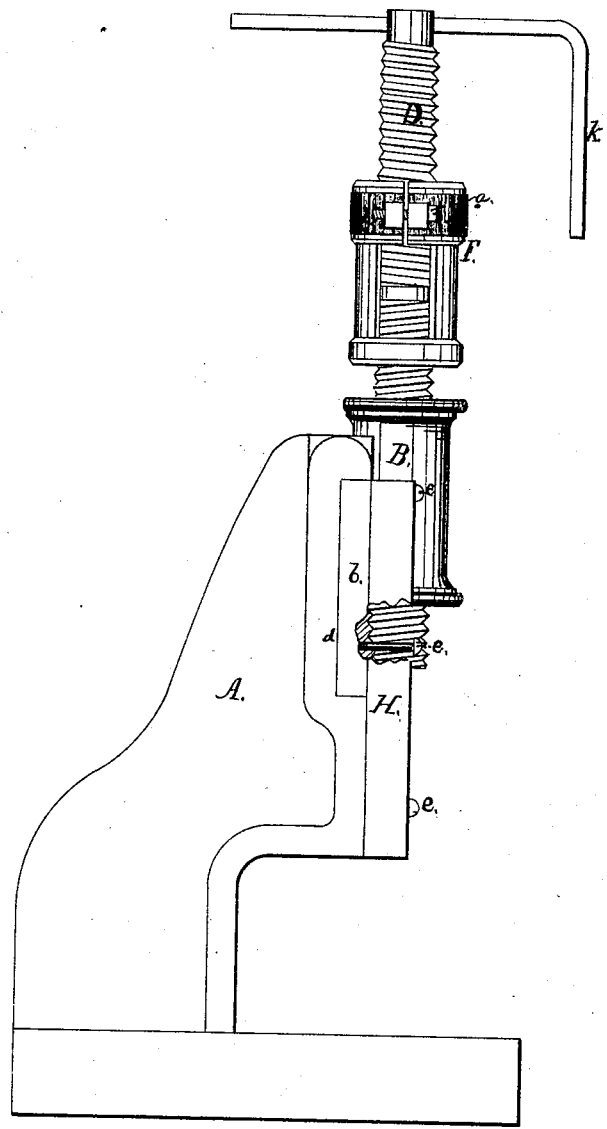
Figure 2:
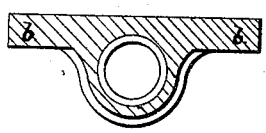

Figure 1 is a side elevation of the press. Fig. 2 is a section of the nut.

In Fig. 1, A is the bed-frame, made without the usual nut cast solid thereon. B is the nut, which, being separate, may be turned out on a small lathe. The flanges *b b*, Fig. 2, are made to fit closely into the recess *d*, formed in the bed A. Vertical slides H are then placed on both sides of the nut, over the lugs *b b*, in which place they are held by the screw-bolts *e e e*. The flange *b* and slide H on the opposite side are held in place by similar bolts. When the nut B is worn it may be taken out and a new nut put in its place. The slides H may be adjusted to the plunger, which is intended to work between them. D is the screw, which is operated by the lever *k*. The lower end of the screw has a right-hand thread cut thereon, and the upper part a left-hand thread. The adjustable stop F has its upper band fitted to the left-hand screw, and its lower portion turned out body size, so as to pass freely over the threads below. In order to adjust the stop F, it should be turned down, with its lower end resting on top of the nut B. The upper end or-band of stop F is split open and provided with a clamp-screw, *a*, which is fastened.

It is obvious that any tendency to turn the stop F by coming in contact with the nut B would be counteracted by the left-hand thread, on which the stop is secured.

Having described our invention, what we claim as new, and wish to secure by Letters Patent, is—

1. The nut B, constructed separate and attached to the frame A, in combination with the slides H, all constructed as and for the purpose set forth.

2. The combination, in a jeweler's press, of the stop F with the right and left screws and the nut B, as and for the purpose specified.

In witness that we claim the above as our own, we affix our signatures in the presence of witnesses April 26, A. D. 1875.

JAMES E. POTTER.
  ALFRED J. RICHARDSON.

Witnesses:
 CHARLES SELDEN,
 JOHN C. BURKIS.